United States Patent [19]

Da Ré

[11] Patent Number: 5,319,951
[45] Date of Patent: Jun. 14, 1994

[54] METHOD FOR MEASURING VALUES OF PARAMETERS INHERENT IN THE DRAWING OF PIECES OF SHEET METAL

[75] Inventor: Mario Da Ré, Turin, Italy
[73] Assignee: Fiat Auto S.p.A., Turin, Italy
[21] Appl. No.: 987,611
[22] Filed: Dec. 9, 1992
[30] Foreign Application Priority Data Dec. 23, 1991 [IT] Italy ................. TO91 A 001026

[51] Int. Cl.$^5$ .................................. B21D 22/02
[52] U.S. Cl. ............................ 72/12; 72/10; 72/347
[58] Field of Search .............. 72/57, 60, 62, 9, 10, 72/11, 12, 347

[56] References Cited

U.S. PATENT DOCUMENTS

| 3,440,847 | 4/1969 | Giordano | 72/12 |
| 4,181,000 | 1/1980 | Hamilton et al. | 72/60 |
| 4,811,582 | 3/1989 | Story et al. | 72/60 |
| 4,878,368 | 11/1989 | Toutant et al. | 72/12 |
| 5,099,666 | 3/1992 | Sartorio et al. | 72/12 |

FOREIGN PATENT DOCUMENTS

| 0366069 | 5/1990 | European Pat. Off. | |
| 0417311 | 3/1991 | European Pat. Off. | |
| 0197021 | 8/1989 | Japan | 72/60 |
| 0774693 | 10/1980 | U.S.S.R. | 72/10 |

Primary Examiner—David Jones
Attorney, Agent, or Firm—Fish & Richardson

[57] ABSTRACT

The model die for measuring values of parameters inherent in the drawing of pieces of sheet metal to produce shaped elements, each including at least one curved surface region which has a critical radius of curvature, has at least one curved surface region which is a copy of the region with critical curvature of the shaped element to be produced. The die has at least one sensor selected from the group comprising pressure, temperature, linear-displacement, vibration, breakage and thickness sensors for measuring the value of a parameter of the drawing of a model shaped element which can be correlated functionally to a corresponding parameter inherent in the drawing of the shaped element on an industrial scale. If the value measured differs from the value which can be calculated or predicted on the basis of a mathematical model of the drawing method, it can be used to improve the mathematical model which can be used for analysing and/or controlling the drawing method.

7 Claims, 1 Drawing Sheet

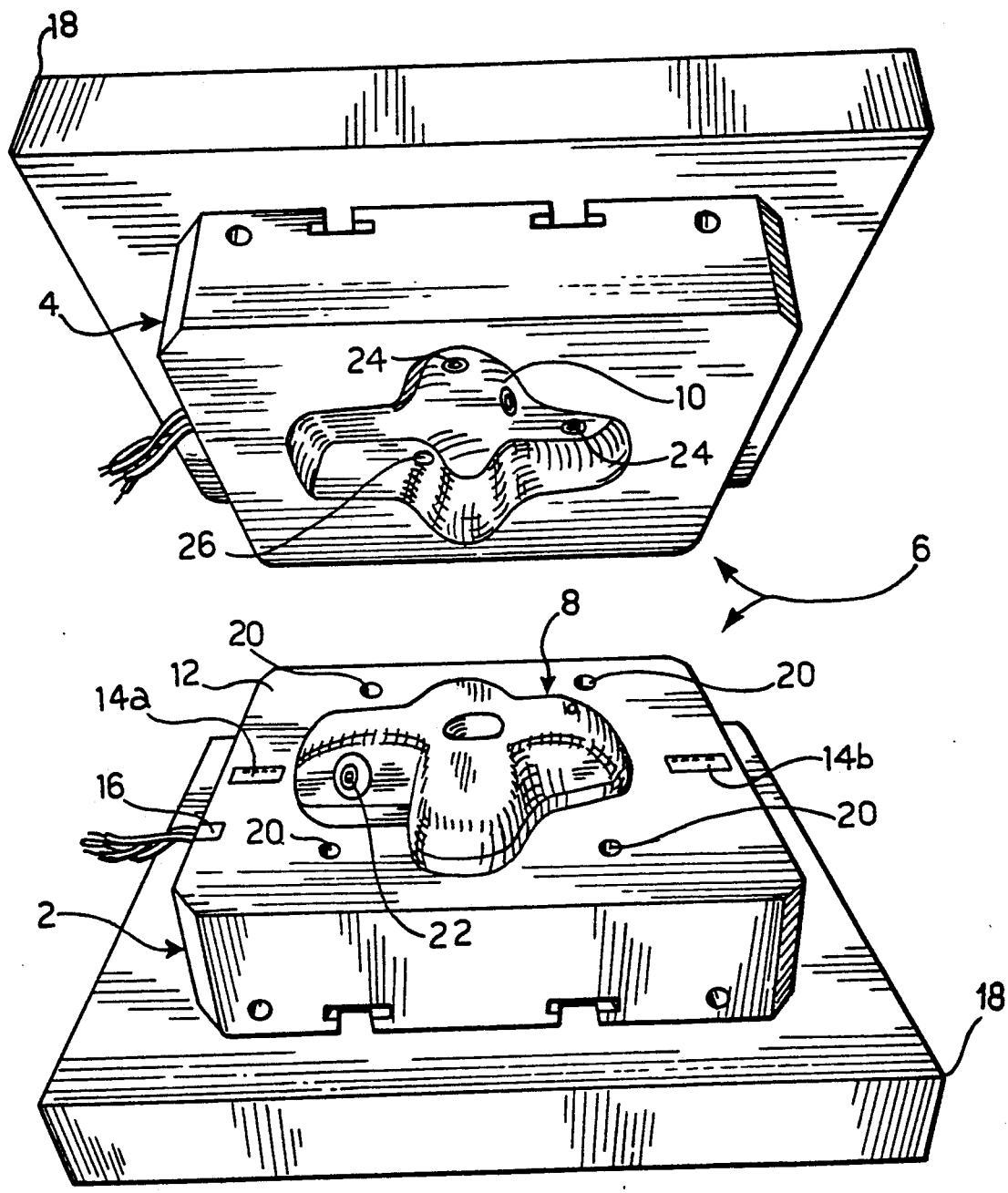

METHOD FOR MEASURING VALUES OF PARAMETERS INHERENT IN THE DRAWING OF PIECES OF SHEET METAL

The present invention relates to a model die for measuring values of parameters inherent in the drawing of pieces of sheet metal and to a drawing method which uses the die. In particular, the model die is used in connection with the production of shaped elements each including at least one curved surface region which has a critical radius of curvature, that is a radius of less than 5 mm.

In the prior art, mathematical models have been developed for simulating drawing processes in order to calculate or predict the values of the various parameters of the processes, such as, for example, stresses and deformations of the sheet metal. The development of the drawing process can be analysed on the basis of these data in order to improve its characteristics, for example, by reducing the cycle time or the energy used.

The mathematical models developed up to now are mainly theoretical, however, and are not so sophisticated as to take account of all the parameters which affect the actual processes and analyses based upon them may therefore not be completely satisfactory.

In order to prevent this problem, the subject of the present invention is a model die of the type indicated above, characterized in that it has at least one curved surface region which is a copy of the at least one region with critical curvature of the shaped element to be produced, the die having at least one sensor selected from the group comprising pressure, temperature, linear-displacement, vibration, breakage and thickness sensors for measuring the value of a parameter of the drawing of a model shaped element which can be correlated functionally to a corresponding parameter inherent in the drawing of the shaped element on an industrial scale, the value measured being usable to improve a mathematical model of the drawing method if the value measured differs from the value which can be calculated or predicted on the basis of the model, which can be used to analyze and/or control the drawing method for the production of the shaped elements on an industrial scale.

A further subject of the present invention is a method of drawing pieces of sheet metal to produce shaped elements, each including at least one curved surface region which has a critical radius of curvature, characterized in that it includes the steps of:

providing a model die having a surface which is a copy of the at least one region of the shaped element which has critical curvature, providing the surface of the model die with at least one sensor selected from the group comprising pressure, temperature, linear-displacement, vibration, breakage and thickness sensors for measuring the value of a parameter of the drawing method, drawing at least one piece of sheet metal with the model die and deriving the value of the corresponding parameter from the at least one sensor, using the value measured to improve a mathematical model of the drawing method if the value measured differs from the value which can be calculated or predicted on the basis of the model, and using the improved mathematical model to analyze and/or control the drawing method for the production of the shaped elements on an industrial scale.

Advantages and characteristics of the present invention will become clear from the detailed description which follows with reference to the appended drawing which is provided by way of non-limiting example and shows schematically and in perspective a model die according to the invention.

The punch and the matrix of a model die 6 for drawing pieces of sheet metal are indicated 2 and 4 respectively. The materials used to construct the die 6 may be, for example, cast iron, steel, or epoxy resins.

The punch 2 has a flat configuration with a central cross-shaped projection 8 with four different arms, and the matrix 4 has a flat configuration with a central recess 10 of a shape corresponding to that of the projection 8.

The projection 8 and the recess 10 have curved surface regions which have critical radii of curvature, that is radii of less than 5 mm, and which reproduce correspondingly curved surfaces of the shaped elements to be produced on an industrial scale.

Two linear-displacement sensors $14a$, $14b$ are disposed in the flat region of the punch 2, on opposite sides of the projection 8. A sensor 16 for sensing vibrations of the die-holder plates 18 is also located near the sensor $14a$. The linear-displacement sensors are, for example, model-2000HR sensors from the firm Schaevitz and the vibration sensor is, for example, a type-4384S sensor from the firm Bruel Kjaer.

Pressure sensors 20 are also located symmetrically in each of the four sectors defined in the flat region by the projection 8. These sensors may be, for example, model-PGM-200KD sensors from the firm Kyowa.

Moreover, a type-8312 ultrasound sensor 22 from the firm Bruel Kjaer is positioned on one of the arms of the projection 8 for detecting sounds emitted during breakage.

As regards the matrix 4, thickness sensors 24, for example, model-Alpha IPS sensors produced by the company Krautkramer, are positioned at the ends of two adjacent arms of the recess 10. Moreover, two temperature sensors 26 of the optical pyrometric type, for example, Thermo Point model-6300 LTCF sensors produced by the company Agema, are located at the junctions between two pairs of adjacent arms.

All the sensors are connected to known devices, not shown in the drawings, for amplifying, recording and displaying the signals received.

The die 6 is used to produce model shaped elements by the drawing of pieces of sheet metal and to derive from the sensors the values of the corresponding parameters of the process which are measured. Should these values differ from the values which can be calculated or predicted on the basis of mathematical models of the drawing method, they can be used to improve the mathematical models. The improved mathematical models are used to analyze and/or control the method for the drawing of pieces of sheet metal on an industrial scale in order to produce shaped elements which have curved regions with critical radii of curvature in a manner corresponding to the drawing of elements by the model die.

I claim:

1. A method for drawing pieces of sheet metal to produce production shaped elements, each of the production shaped elements including at least one curved surface region with a critical radius of curvature, said method comprising the steps of:

providing a model die having a surface which is a copy of the at least one curved surface region with a critical radius of curvature of the production shaped element, providing the surface of the model die with at least one sensor for measuring the value of a parameter of the drawing method, drawing at least one piece of the sheet metal with the model die and measuring the value of the corresponding parameter using the at least one sensor, calculating or predicting a value of the corresponding parameter on the basis of a mathematical model, comparing the value measured using the at least one sensor to the value calculated or predicted using the mathematical model, and, if a difference is found, using the value measured to improve the mathematical model of the drawing method, and using the improved mathematical model to analyze and/or control the drawing method for the production of the production shaped elements on an industrial scale.

2. The method of claim 1 comprising measuring the value of the parameter of pressure using at least one sensor.

3. The method of claim 1 comprising measuring the value of the parameter of temperature using at one sensor.

4. The method of claim 1 comprising measuring the value of the parameter of linear-displacement using at least one sensor.

5. The method of claim 1 comprising measuring the value of the parameter of vibration using at least one sensor.

6. The method of claim 1 comprising measuring the value of the parameter of breakage using at least one sensor.

7. The method of claim 1 comprising measuring the value of the parameter of thickness using at least one sensor.

* * * * *